United States Patent
Nandy et al.

(10) Patent No.: US 7,653,885 B2
(45) Date of Patent: Jan. 26, 2010

(54) SELECTION OF CELLS FROM A MULTIPLE THRESHOLD VOLTAGE CELL LIBRARY FOR OPTIMIZED MAPPING TO A MULTI-VT CIRCUIT

(75) Inventors: Sourav Nandy, Ghaziabad (IN); Qi Wang, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 121 days.

(21) Appl. No.: 11/746,026

(22) Filed: May 8, 2007

(65) Prior Publication Data
US 2008/0189662 A1    Aug. 7, 2008

Related U.S. Application Data (60) Provisional application No. 60/899,728, filed on Feb. 5, 2007, provisional application No. 60/890,462, filed on Feb. 16, 2007.

(51) Int. Cl.
  *G06F 17/50* (2006.01)
(52) U.S. Cl. .......... 716/2; 716/1; 716/3; 716/4; 716/5; 716/18; 703/13; 703/14
(58) Field of Classification Search ........ 716/1–5, 716/18; 703/13–22
See application file for complete search history.

(56) References Cited

U.S. PATENT DOCUMENTS

| | | | | |
|---|---|---|---|---|
| 5,696,694 | A | * | 12/1997 | Khouja et al. ............ 716/5 |
| 5,956,497 | A | | 9/1999 | Ratzel et al. |
| 6,243,849 | B1 | | 6/2001 | Singh et al. |
| 6,272,671 | B1 | | 8/2001 | Fakhry |
| 6,324,671 | B1 | | 11/2001 | Ratzel et al. |
| 6,598,209 | B1 | | 7/2003 | Sokolov |
| 6,901,565 | B2 | | 5/2005 | Sokolov |
| 7,257,801 | B2 | * | 8/2007 | Sakiyama et al. ......... 716/17 |
| 2007/0011643 | A1 | * | 1/2007 | Wang et al. ............. 716/18 |

* cited by examiner

*Primary Examiner*—Jack Chiang
*Assistant Examiner*—Nghia M Doan
(74) *Attorney, Agent, or Firm*—Duane Morris LLP

(57) ABSTRACT

A method is provided to select circuit cells for use in optimization of an integrated circuit design from among a plurality of circuit cells within a cell library, the method comprising: obtaining a value for each cell of the plurality that is indicative of both the cell's power dissipation and the cell's rate of output voltage change; ordering the cells of the plurality based upon the values; identifying a difference between values of cells that are proximate each other within the ordering of the cells that meets a threshold; and designating a cut point within the ordering of the cells based upon the identified difference.

19 Claims, 5 Drawing Sheets

SELECTION OF CELLS FROM A MULTIPLE THRESHOLD VOLTAGE CELL LIBRARY FOR OPTIMIZED MAPPING TO A MULTI-VT CIRCUIT

CROSS REFERENCE TO RELATED APPLICATIONS

This patent application claims priority to U.S. Provisional Patent Application Ser. No. 60/899,728, filed Feb. 5, 2007, which is expressly incorporated herein by this reference. This patent application also claims priority to U.S. Provisional Patent Application Ser. No. 60/890,462, filed Feb. 16, 2007, which is expressly incorporated herein by this reference.

BACKGROUND OF THE INVENTION

1. Field of the Invention

The invention relates to the design of electronic circuits and more particularly to optimized mapping of cells having different threshold voltages to an integrated circuit design.

2. Description of the Related Art

Synthesis of an integrated circuit design involves a process of translation of a behavioral description of the design to a structural description of the design optimized according to one or more constraints such as timing, power dissipation, area or testability. A designer ordinarily sets forth a behavioral description of a design in a high level descriptive language (HDL) such as Verilog or VHDL, or describes a model of the design in the C or C++ programming language, for example. Ordinarily, an HDL description describes a register transfer level (RTL) model of a design in terms of data flow between registers that store information between clock cycles in a circuit.

In an RTL description storage devices (i.e., registers) store current circuit state information, and a set of logical equations define the next state of the circuit. The next circuit state is stored in the storage devices in response to a clock signal defined for the circuit. The clock signal defines the interval of time in which the next state is to be computed, and is used by the storage devices to determine when to sample an input to the storage device. An input value thus sampled is stored in the storage device until the subsequent sampling point occurs upon the occurrence of a later clock signal.

During synthesis, an RTL behavioral description of a circuit design is converted into a netlist, which is a list of electronic logic cells with a description of the interconnections between inputs and outputs of the various cell instances. The cells of the netlist are used to implement the logical next state equations of the RTL description. The cells in the netlist are obtained from of a cell library. A cell represents a circuit element that is available in a particular implementation technology. A cell library may comprise a few hundred cells corresponding to primitive function circuits, such as inverters, NAND gates, NOR gates and possibly to more complex Boolean function circuits and perhaps, to sequential elements like latches and flip-flops.

A cell may itself be defined in terms of a netlist that includes a cell model that specifies logical, electrical, and physical attributes and that may include one or more primitives circuits. One typical cell attribute is its logical function (e.g., AND, OR, NAND, NOR, INVERT, etc., or a complex logical function implementing an equation of basic combinational or sequential functions). Other cell attributes provide information concerning a variety of the cell's characteristics such as timing, area, power dissipation, testability and threshold voltage (Vt), for example.

During synthesis, cells are mapped from the cell library to a netlist generated from the RTL description. A typical cell library may include multiple cells that have the same basic function attribute but differ in one or more other attributes. For example, a cell library may include multiple different cells that perform a two-input NAND logic function, but each such functionally equivalent cell may employ transistors having different threshold voltages (Vt).

Synthesis uses constraint-driven optimization techniques to select from among multiple cells with similar functionalities when mapping cells to netlist locations. Optimized mapping based upon cell threshold voltage has become increasingly important since the impact of leakage power upon performance increases as the physical dimensions of circuit become smaller. In general, a lower Vt transistor can switch (i.e., change states) more rapidly than a higher Vt transistor. A lower Vt transistor typically has a larger leakage current than a higher Vt transistor. As a result, a lower Vt transistor ordinarily dissipates more power than a higher Vt transistor. Thus, there often is an inherent trade-off between power dissipation and switching speed when selecting between cells having different threshold voltages.

In particular, transistor sub-threshold leakage current grows exponentially and becomes an increasingly large component of total power dissipation with scaling down of technology. For instance, the drain current of a MOSFET in the sub-threshold region can be expressed as (assuming $V_{ds}$ [drain to source voltage] is large compared to the thermal voltage)

$$(1)\ I_{threshold} = I_0 + 10^{((Vgs-Vt)/S)} \qquad (1)$$

where, $I_0$ is the drain current with $V_{gs}$ [gate to source voltage]=$V_t$ [threshold voltage] and S is the sub-threshold slope. It will be appreciated that even a small decrease in $V_t$ can result in an order of magnitude increase in the sub-threshold leakage current.

Consequently, multiple-Vt optimization aimed at leakage power optimization has become an important phase of synthesis. During a multiple-Vt optimization phase, cells are mapped to netlist locations based at least in part upon threshold voltage constraints. Typically, lower Vt cells are selected for timing critical circuit paths, and higher Vt cells are selected for non-critical timing paths to reduce leakage current.

Unfortunately, there have been shortcomings with prior multiple Vt optimization techniques. Past approaches to multiple-Vt optimization often involved name-based cell identification that placed a heavy reliance on library cell names to identify cells having similar functionality but different threshold voltages. In other words, these prior techniques often relied upon a library vendor having named cells with sufficient clarity to discern cells having different threshold voltages but the same functionality. For example, in order to satisfy timing constraints, an optimization process might seek to replace a high Vt cell with a functionally equivalent low Vt cell. Under an earlier approach, identification of the corresponding low Vt cell would be largely dependent on matching the name of the low Vt cell with a name of the high Vt cell in the library. For instance, functionally equivalent cells may be named ANDHVT20 and ANDLVT20, where H stands for high-vt and L stands for low-vt so as to form a basis for name-based cell replacement. This name based approach has other potential drawbacks. For example, it may be unclear what Vt-based selection criteria to use if a corresponding low Vt cell or high Vt cell counterpart to a given cell does not exist in the library. The name based mapping process also places a heavy reliance upon correct designation of cell names in vendor libraries. Occasionally, an HVT cell may be incorrectly designated as an LVT cell in a vendor library, which can lead to degradation of overall results in terms of power.

Moreover, prior synthesis flows often comprised an initial optimization using low Vt cells followed by leakage reclamation using high Vt cells. Unfortunately, this synthesis flow has drawbacks. For example, leakage power obtained with this prior flow may not be optimal since the initial passes did not use high Vt cells for optimization.

Thus, there has been a need for improvement in the selection and use of cells for multiple threshold voltage optimizations during synthesis. The present invention meets this need.

SUMMARY OF THE INVENTION

A method is provided to select circuit cells for use in optimization of an integrated circuit design from among a plurality of circuit cells within a cell library. The method includes obtaining a value for each cell of the plurality that is indicative of at least the cell power dissipation and the cell rate of output voltage change. The cells are ordered based upon the values. Differences are identified between values of cells that are proximate each other within the ordering of the cells that meets a threshold. A cut point is designated within the ordering of the cells based upon the identified difference.

In some embodiments, a cell's rate of output voltage is ascertained in terms of slew sensitivity. The threshold voltage of a cell is related in general to the cell's power dissipation and slew sensitivity. In general, larger power dissipation is indicative of a lower threshold voltage, and lower slew sensitivity is indicative of a lower threshold voltage.

Therefore, in accordance with some embodiments of the invention, library cells can be ordered based upon their relative threshold voltage values determined based upon a combination including values of their individual power dissipation and slew sensitivity. The ordering can be used to selectively choose from among groupings of high, standard and low voltage threshold cells during circuit optimization. In some embodiments, high and standard threshold voltage cells are grouped together, separate from low threshold voltage cells.

These and other features and advantages of the invention will be apparent from the following detailed description of embodiments in conjunction with the appended drawings.

DETAILED DESCRIPTION OF THE EMBODIMENTS

The following description is presented to enable any person skilled in the art to make and use a system and method select cells from a cell library for use in a mapping stage of a circuit design optimization process in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

During synthesis, circuit cells are mapped from a cell library to a circuit design using a computer system having computer readable memory encoded with a computer software program synthesis tool. A global mapping stage initiates optimization based on a single cost function that takes into account multiple parameters such as timing, area and power. Global mapping simultaneously incorporates the effects of the various contributors to mapping the netlist, e.g. timing, area and power, to transform the netlist across the entire circuit. Following the global mapping stage, incremental mapping may implement transformations locally across select portions of the circuit or across the entire circuit based on priority given to one parameter such as timing, area or power, to improve performance of critical/non-critical paths in the circuit.

One objective in mapping cells to a design is to optimize leakage power without sacrificing critical timing. Efficient convergence to an optimal mapping solution can be heavily dependent upon prudent selection of library cells passed to a mapping process during an initial mapping stage. Selecting cells with threshold voltage characteristics may imply a trade-off between power dissipation and switching speed. An optimization process maps cells that have higher threshold voltages characterized by slower switching speeds and lower leakage current, to non-critical timing paths. Conversely, the optimization process maps cells that have lower threshold voltages characterized by higher switching speeds and higher leakage current, to timing critical paths. Thus, in speed-critical paths, increased power dissipation may be sacrificed to achieve greater switching speed, but in non-critical paths, reduced power dissipation surpasses switching speed as the dominant constraint.

An optimization process flow in accordance with some embodiments of the invention maps cells selected from a cell library based upon threshold voltages, to a circuit design netlist. A global optimization process initially maps less leaky high Vt cells to the design and subsequently maps higher switching speed low Vt cells to the design. In the event that timing is not met following the initial optimization stage, incremental optimization starts with initial leakage power resulting from having initially mapped lower leakage cells to the design. During incremental mapping, a timing focused incremental optimization process may seek to optimize the critical paths for timing improvement. Also, during incremental optimization, an area focused incremental optimization process may seek to optimize area.

Figure 1:
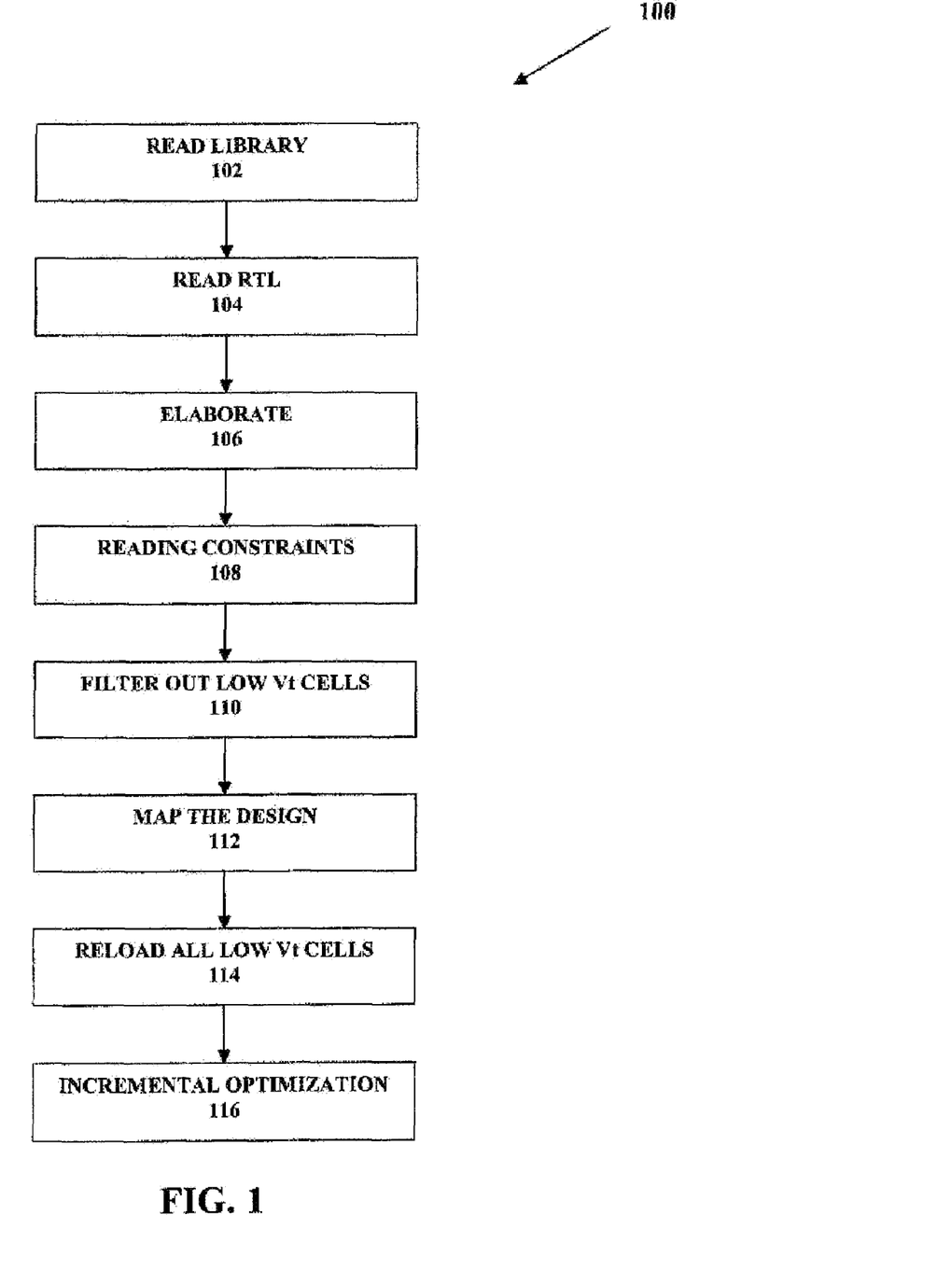
FIG. 1 is an illustrative flow diagram drawing of an optimization process during circuit synthesis that uses cells selected in accordance with some embodiments of the invention.

FIG. 1 is an illustrative drawing of an optimization process 100 during circuit synthesis that maps cells selected in accordance with embodiments of the invention. During optimization, the design may be optimized for timing, power, or area or based upon some other criteria. During a read library stage 102, cells are read from a technology library stored in computer readable memory. During a read RTL stage 104, an RTL description of the design in a high level descriptive language (HDL) such as Verilog or VHDL, is read from a technology library stored in computer readable memory. In the elaborate stage 106, the RTL representation is translated to a generic netlist. In a reading constraints stage 108, constraints upon timing, area, or power or some other design criteria, are input by a user. During a filter out low Vt cells stage 110; low Vt cells are filtered out from the cells read from the cell library in accordance with an embodiment of the invention. In a map the design stage 112, high Vt cells and standard Vt cells are mapped globally to the design according to the constraints. During the reload all low Vt cells stage 114; the low Vt cells that had been filtered out are reloaded for mapping during incremental optimization. In an incremental optimization stage 116, low Vt cells are selectively inserted into portions of the design that do not meet timing constraints. The reload stage 114 and the incremental optimization stage 116 are optional and may be required if only portions of the design do not meet timing requirements following the mapping stage 112. The optimization process is performed by a computer system. Computer program code encodes with computer system to perform the optimization process.

In accordance with some embodiments of the invention a, computer program code encodes computer readable memory of a computer system to cause the system to perform a method to partition cells for use in the initial global mapping phase of the optimization process based upon cell characteristics associated with voltage thresholds. Specifically, the computer program method partitions cells in a cell library based upon a combination of rate of output voltage change characteristics of the cells, power dissipation characteristics of the cells and area characteristics of the cells. Typically, high Vt cells have lower leakage current (i.e., lower power dissipation) than standard Vt cells, which in turn have lower leakage than low Vt cells. Conversely, low Vt cells ordinarily have faster switching speeds than standard Vt cells, which in turn have faster switching speeds than high Vt cells.

Cells with essentially the same functions often have similar area whether they are characterized as high Vt, standard Vt or low Vt. Variation in cell leakage power generally is greater than variation in cell area or cell timing. In some cell partitioning process embodiments, area is included in the determination of the factor value such as that described below, in order to gather cells of a similar nature into the same bucket. Note that below 90 nm, even cells which are all of one type (be it high Vt, standard Vt or low Vt) can have significant variations in factor values amongst themselves, but ideally we would like them to be reside close to one another in the groupings.

Figure 2:
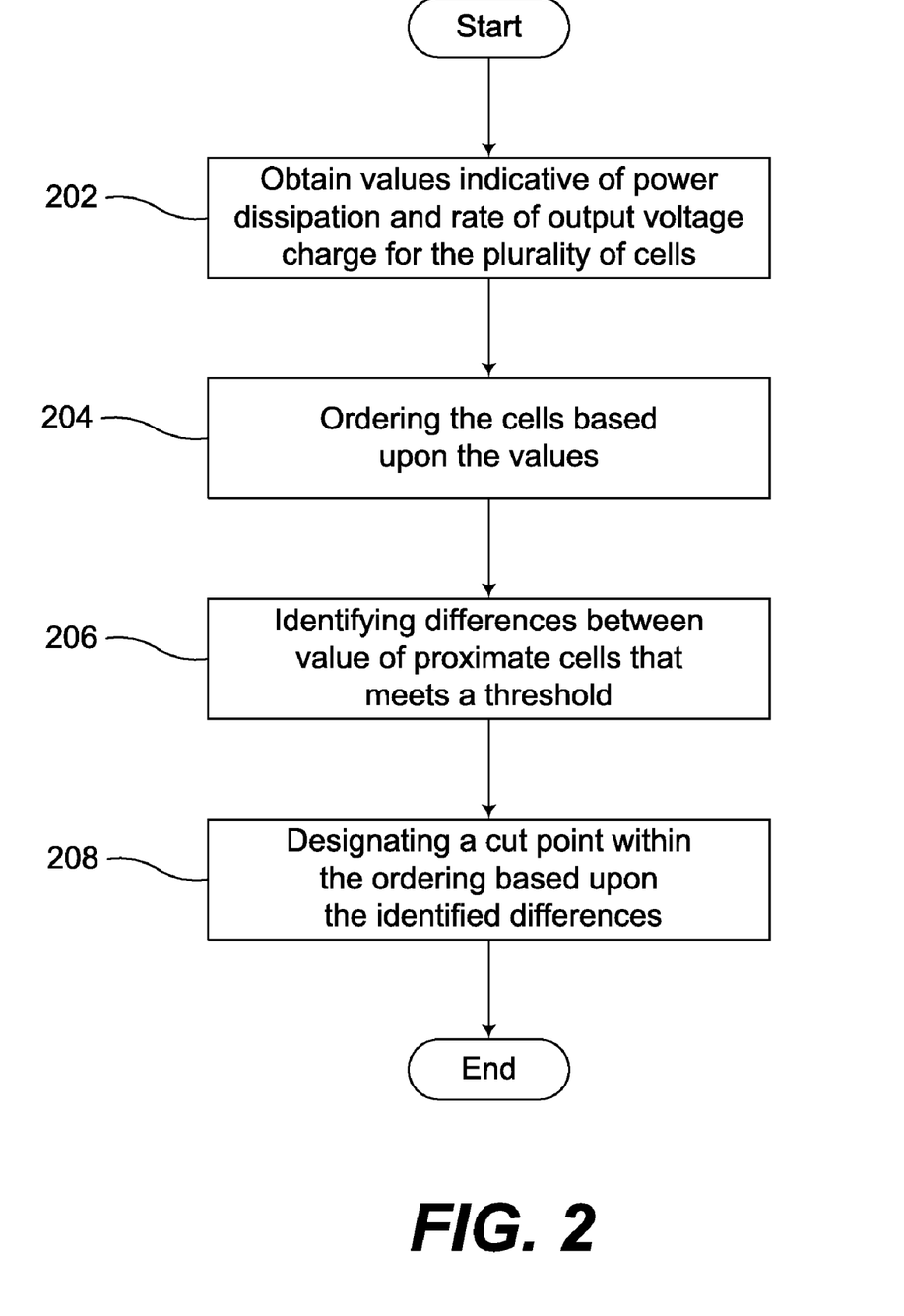
FIG. 2 is an illustrative flow diagram of a cut-point selection process in accordance with some embodiments of the invention.
Figure 4:
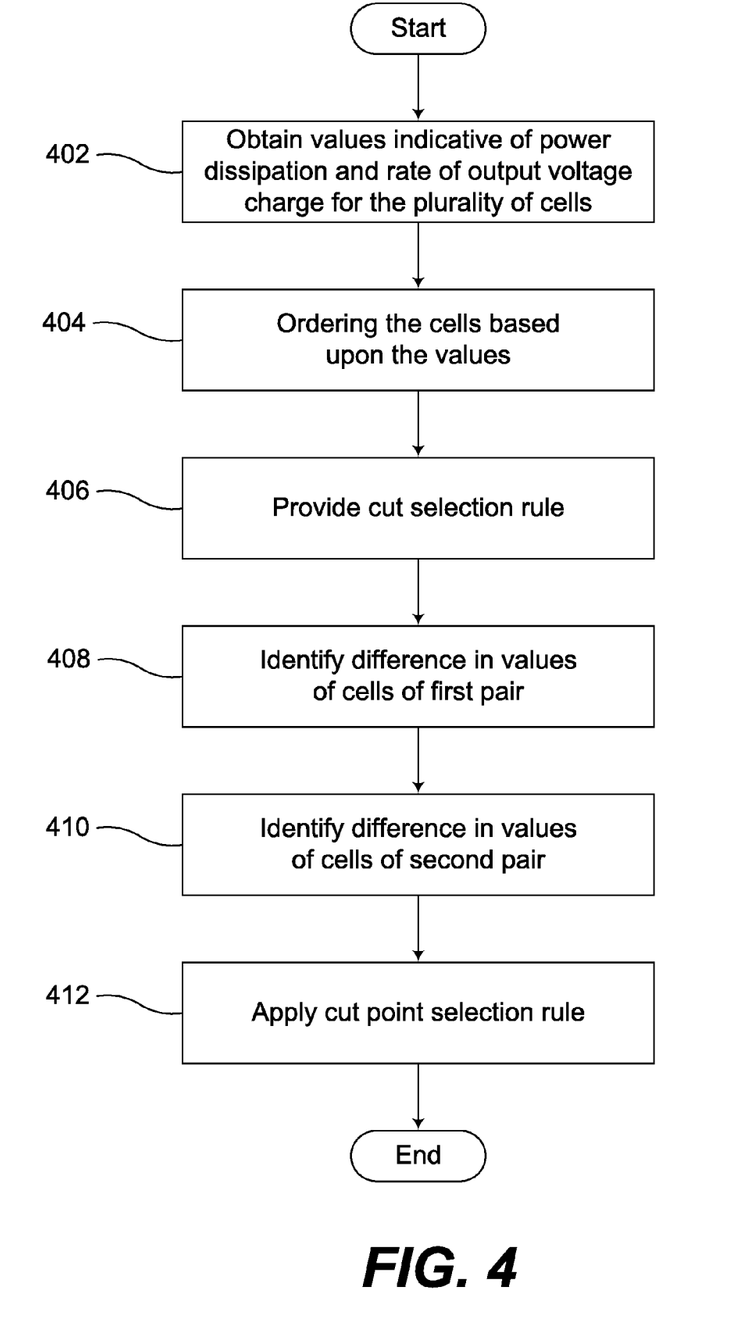
FIG. 4 is an illustrative flow diagram of a cut-point selection process involving a cut point selection rule in accordance with some embodiments of the invention.

In accordance with some embodiments of the invention, a cell selection process obtains a value, as represented in FIG. 2 and FIG. 4 by steps 202 and 402, respectively, for each one of a plurality of cells, such as for cells in a cell library having an identical function attribute (e.g. two-input NAND), that is indicative of the cell's static power dissipation (i.e., sub-threshold leakage current), its switching speed (i.e., rate at which its output voltage changes) and its area. It will be appreciated that such value also is indicative of a cell's threshold voltage. In some embodiments, the value is computed based upon the power dissipation, switching speed and area information provided by the individual cells of the cell library. The terms high, standard and low as applied to the threshold voltage (Vt) are relative terms. For instance the value of standard Vt is technology library dependent.

More specifically, in some embodiments, the selection process produces a value for each cell of a plurality of cells in accordance with the following formulation.

$$\text{factor} = P\text{cell\_leakage}/(A\text{cell} \times T\text{cell}) \quad (2)$$

Figure 3:
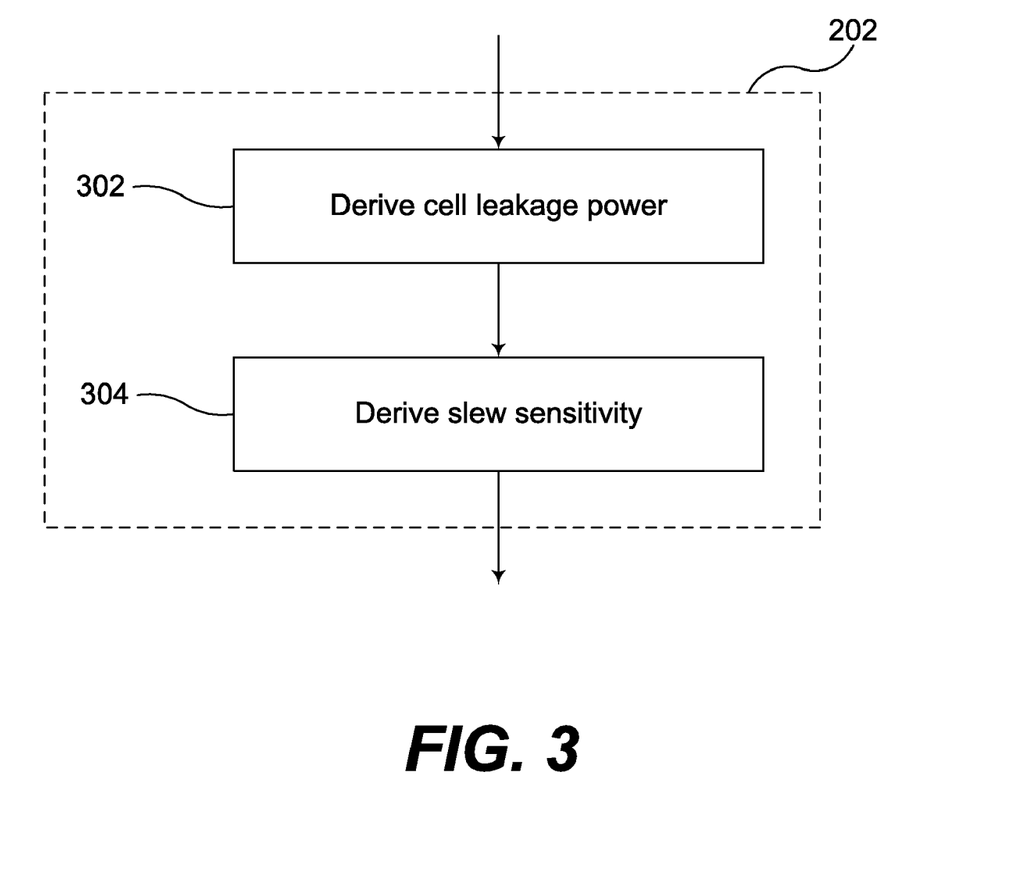
FIG. 3 is an illustrative flow diagram showing details of a block from FIG. 2.

The value Pcell_leakage represents cell leakage power. Cell leakage power generally is modeled in a cell library as a constant with specification. For sub-threshold technologies, cell leakage power is derived as a function of the input state model (state dependent) for accuracy. The derivation of cell leakage power corresponds to step 302 in FIG. 3.

A cell's leakage power is given as:

$$P\text{cell\_leakage} = \text{state}=1 \ldots k\Sigma(P\text{state\_leakage} \times \text{probabilitystate}) \quad (3)$$

where:

the value k represents the number of states for a cell. The value Pstate_leakage, which typically can be obtained from the cell library, represents the leakage of the cell in that state The value probabilitystate, which typically can be obtained from the cell library, represents the probability that the cell is in that state. The factor value is indicative of the cell leakage power since the cell leakage power is used in the computation of the factor value.

The value Acell represents a cell area construct, which is provided in the cell library as indicated in example Tables 1-3. The factor value is indicative of the cell area since the cell area is used in the computation of the factor value.

The value Tcell represents slew sensitivity of a cell. The factor value is indicative of cell slew sensitivity since the cell slew sensitivity is used in the computation of the factor value.

Slew sensitivity is a metric related to the timing characteristics of the cell. Specifically, slew sensitivity is a measure of how fast a cell reacts to an input slew. Slew sensitivity is indicative of a cell's switching speed, i.e., the rate at which an output value of the cell changes state during switching. It is calculated as the output load based on a reference slew obtained from a reference load with respect to a standard slew at the input of the cell.

In some embodiments, the slew sensitivity is derived using a computer program code that encodes a computer readable memory of a computer system to cause the system to perform the process illustrated in Table 1. The derivation of slew sensitivity is represented by step 304 in FIG. 3.

TABLE 1

(Process to compute Cell Slew Sensitivity)

For a given library cell C, calculate reference load R1 as,
   1.   R1 = (Load of all input pins of C)/(Number of input pins of C) {R1 can be derived from the cell library}
   2.   Apply '0' slew signal at inputs of C with reference load R1. {A '0' slew signal is a signal having a delay value of '0'}
   3.   Calculate reference output slew S1 as, TABLE 1-continued (Process to compute Cell Slew Sensitivity)

4. S1 = max (input to output pin delays of C) {S1 is the maximum time that it takes for a signal to propagate to the output from any of the inputs in the cell based on reference load}
6. Get all output pin loads of C for all output pins from setup arcs and S1. {Output pin loads are determined from the timing arcs from input to output in the cell library based on the reference slew}
7. Get rdelay = max (rise delays) of output pins from loads. {The value rdelay is the maximum of all the rise delay values derived in step above}
8. Get fdelay = max (fall delays) of output pins from loads. {The value fdelay is the maximum of all the fall delay values derived in step above}
$T_{cell}$ (cell slew sensitivity) = rdelay + fdelay Slew rate of a cell is the rate of change of the cell's output (from high to low or from low to high). Slew sensitivity as used herein, is a measure of change in slew per change in output load. For example, a slew rate may represent the amount of time required for a signal to switch from 10% to 90% of its final value or vise versa. Some cells may have a faster rise time or a faster fall time due to the internal structure of the device represented by the cell.

Slew sensitivity also is indicative of the drivability of a cell, that is, how fast the circuit will be driven by this cell. A circuit's drive strength is a measure of its ability to charge/discharge a largely capacitive load (e.g. the input pins of other cells plus the wiring there between). High drive strength indicates the ability to charge/discharge a large load quickly, while low drive strength indicates a longer time period for charging/discharging a large load. The drive strength may be characterized by an output resistance for the cell. In general, the higher a cell's drivability, the less its slew sensitivity, i.e., less the variation in strength of signal which means it can drive larger loads. Thus low Vt cells have low slew sensitivity. The more sensitive a cell is to changes in output load, the lower the drivability of the cell. Conversely, the less sensitive a cell is to changes in output load, the higher the drivability of the cell.

The factor determined in equation (2) is used to allocate cells within clusters that are within groups. As used herein, a "group" is as a congregation of similar functionality cells in a particular voltage threshold (Vt) category. Three categories are, high Vt, standard Vt and low Vt. As used herein, a "cluster" is a congregation of cells which falls in a group. There may be single or multiple clusters in a group.

The value of the factor of equation (2) for a given cell is indicative of the group, within which the cell falls, assuming three groups: high Vt, standard Vt and low Vt. In general, low Vt cells have a lower value of Tcell, since these cells are faster cells. Also, low Vt cells also have relatively high values of Pleakage, since these cells have higher sub-threshold leakage currents. Therefore, low Vt cells have relatively large factor values. Conversely, high Vt cells generally have a higher value of Tcell, since these cells are slower cells. Also, high Vt cells also have relatively low values of Pleakage, since these cells have lower sub-threshold leakage currents. Therefore, high Vt cells have relatively small factor values. Hence the factor value associated with cells increases from high Vt cells to standard Vt cells to low Vt cells. Thus, a cell's factor value is indicative of both the cell's power dissipation and its rate of output voltage change. Stated differently, for a specific cell functionality type, high Vt cells fall in a range 1 to k−1, standard Vt cells fall in a range k to m−1 and all low Vt cells fall in a range m to p (where p>m>k>1 are integers which signify boundaries of the groups).

In accordance with some aspects of the invention, factor values obtained for cells are used to determine which cells to use to map to a design in the course of an earlier optimization phase during which limiting of power dissipation predominates over timing driven constraints. In Table 2, there is shown an illustrative example of a set of cells, each associated with a factor computed in accordance with equation (2). The cells in Table 2 are shown ordered according to the magnitudes of their associated factor values. Referring to FIG. 2 and FIG. 4, ordering is represented by Steps 204 and 404 respectively. All of the cells in Table 2 have basically the same functionality. The hvt* cells are the high Vt cells. The svt* cells are the standard Vt cells. The lvt* cells are the low Vt cells.

TABLE 2

(Same Functionality Cells Ordered According to Factor Values)

hvt1 (0.23), hvt2 (0.35), hvt3 (0.46), hvt4 (0.59), svt1 (1.75), svt2 (2.1), vt3 (3.5), svt4 (7.9), svt5 (10.7), svt6 (17.1), lvt1 (660.2), lvt2 (1000.3), lvt3 (1505.5), lvt4 (2300.1)

The cells are shown to be ordered, according to the ordering step 204, in that cell factor values increase from left to right. The ordering is defined as each cell being at least one of a cell having a next higher or next lower factor value relative to the cell's own factor value. For example, cell hvt3 is adjacent to cell hvt2 and is adjacent to cell hvt4. Cell hvt2 has a factor value of (0.35), which is the next lower factor value relative to hvt3's factor value of (0.46). Cell hvt4 has a factor value of (0.59), which is the next higher factor value relative to hvt3's factor value of (0.46). Similarly, for example, cell lvt4 is adjacent to cell lvt3. Cell lvt3 has a factor value of (1505.5), which is the next lower factor value relative to lvt4's factor value of (2300.1). There is no cell with a factor value greater than lvt4's (2300.1). Therefore, cell lvt4 has only one adjacent cell.

It will be appreciated that while the illustrated embodiment identifies factor value changes for cells that are immediately adjacent, the principles of the invention apply for factor value differences in cells that are proximate (or nearby) each other in the ordering. Moreover, as explained below, a cluster boundary may be determined to be between cells for which a factor values jumps by more than some prescribed amount.

There are three groups of cells in this example, a high Vt group from hvt1 to hvt4, a standard Vt group from svt1 to svt6 and a low Vt group from lvt1 to lvt4. There also are four clusters of cells, which are hvt1 to hvt4, svt1 to svt3, svt4 to svt6 and lvt1 to lvt4. As explained more fully below, cluster partitions are formed wherever the factor value jumps by more than a multiple of two as between adjacent cells, which corresponds to step 206 in FIG. 2. In this example, the low Vt cells are way too leaky to be used in an initial optimization focused on power dissipation, and accordingly, they are filtered out.

The inventors observed that for cell libraries with smallest dimensions above 90 nm, the jump in factor value from high Vt cells to standard Vt cells and from standard Vt cells to low Vt cells were consistently found to be more than a multiple of two. In other words, considering a set of cells ordered based on factor values as described above, the inventors found that a jump in factor value of more than a multiple of two signified a transition threshold from the high Vt cell group to the standard Vt cell group or from the standard Vt cell group to the low Vt cell group.

The inventors also observed that for cell libraries with smallest dimensions of 90 nm and below, the rise in Pleakage was far more drastic than the change in the Acell and Tcell values. As a result, a jump of factor value of more than a multiple of two was commonplace even within the same group of high Vt, standard Vt or low Vt cell categories. Thus, the inventors determined that a multiple of two or greater jump in factor value was not indicative of a transition threshold from one group to another for cell libraries with gate dimensions of 90 nm and below.

Process of Filtering (Approach 1)

In a first filtering approach, first computer program code encodes a computer readable memory of a computer system to cause the system to perform a first cell filtering process is suited to cell libraries with smallest dimensions above 90 nm. An objective of this cell filtering process is to identify cells to eliminate from an initial optimization stage that emphasizes minimizing power dissipation over timing considerations. The process aims to identify a cut point in the ordered set of cells based upon a factor value difference threshold, which corresponds to step 208 in FIG. 2. In this first approach, the factor value difference threshold is prescribed to be a multiple of two or more difference in factor values. A cut point in the ordering of the cells is established between the first pair of cells arrived at, while traversing the ordering from lowest factor value cell toward highest factor value cell, for which factor values differ by a multiple of two or more. The inventors have found that for ordered sets of cells with two groups (e.g. high Vt and low Vt), this first approach designates a cut point at the beginning of the second group, i.e., at the beginning of the low Vt group. The inventors have found that for ordered sets of cells with three groups (e.g. high Vt, standard Vt and low Vt), this first approach designates a cut point at the beginning of the third group, i.e., at the beginning of the low-Vt group. In other words, the first approach as applied to three groups (i.e., for 3-Vt libraries), sets the cut point at the second place in the ordering at which the factor value jumps by a factor of more than two.

While the first approach was found to be generally acceptable for cell libraries with smallest dimensions above 90 nm, the technique was found to lack efficacy for libraries with smallest dimensions at 90 nm or below. For cell libraries with such smaller cell dimensions, factors values were found to have greater variability owing to larger variations in leakage power. Consequently, individual groups often had several clusters due to frequent factor jumps of more than a multiple of two. As a result, cut points more often could be designated at locations in the ordering that would lead to filtering out of cells with acceptable power dissipation characteristics.

Moreover, under the first approach, cut-point determination was rigid and not dynamic since the cluster boundary at which to make the cut point was fixed irrespective of the number of clusters existing. There was no mechanism to filter cells based on a cell's position in a group. A typical case to illustrate the problem of rigid cut point designations is as follows. Assume, for example that there were three clusters in three groups, a first cluster having five cells, a second cluster having seven cells and a third cluster having just one cell. Now, assume that the filtering process is configured to always (i.e., rigidly) filter out the last cluster. In this example, the cut point would be placed between the next-to-last cell and the last cell. As a result, only the lone last cell would be filtered out, and the rest would be kept to be passed to the optimizer. There is a possibility that some low Vt cells were placed in the second cluster and that failure to filter them could prove detrimental to the optimization efficiency.

Process of Filtering (Approach 2)

In a second filtering approach, second computer program code encodes computer readable memory of a computer system to cause the system to perform a second cell filtering process, the clustering is still based on a factor jump of more than a prescribed threshold. In an embodiment of this second approach, the prescribed threshold is a multiple of two from one cell to the next in a set of cells ordered based on factor values. Cluster boundaries are defined by factor value jumps by a multiple of two or more between adjacent cells, i.e., from one cell to the next, in a set of cells ordered based upon factor values. Thus, a threshold comprising a factor jump of more than a multiple of two from one cell to the next is a basis for demarcating a new cluster. The inventors have found that, for cell libraries with cells having dimensions below 90 nm, it is not unusual for each group in a set of factor value ordered cells to have multiple clusters. For instance, referring to the ordered cells set forth in Table 2, there are cluster boundaries between cells hvt4 and svt1 and between cells svt3 and svt4 and between svt6 and lvt1. Furthermore, for example, there are two clusters within the standard Vt group: the cluster that has cells svt1, svt2 and svt3 and the cluster that has cells svt4, svt5 and svt6.

A selection process in accordance with the second approach uses a set of rules to dynamically choose a cut point based on several factors. The provision of a set of rules corresponds to step 406 of FIG. 4. A first rule, which serves as a default rule, selects the location in the ordering of the maximum jump in factor values as the best candidate for the cut-point. A rationale behind this first rule is that a significant jump in factor values signifies the beginning of a string of cells within the ordering that are too leaky, and that these cells are good candidates for removal so as to not present them to an optimization process stage that emphasizes placement of non-leaky cells. There are several countervailing considerations in the selection of the optimal cut point, however. Each countervailing consideration corresponds to an additional refinement of the cut point rules In Table 3, each row represents multiple cells (not shown) of a cell library that have substantially the same functionality, and each row entry J1 to J5, represents a cluster boundary that is demarcated by a jump in factor value by more than a prescribed threshold, i.e., by a multiple of two or more. Each entry J1 to J5 designates a cluster boundary, i.e., the end of one cluster and the beginning of the next cluster. Specifically, each row in Table 3 corresponds to a factor value ordered set of cells. The J-values represent factor value jumps between adjacent cells by a multiple of two or more. The identification of these jumps corresponds to steps 408-410 if FIG. 4. The J-values are ordered: the J1-value in each row is the first jump in factor values by a multiple of two or more in the corresponding ordered set; the J2-value in each row is the second jump in factor values by a multiple of two or more in the corresponding ordered set, etc. For example, in the first row of Table 3, the J1 entry (2.8) indicates that the first factor value jump by a multiple of more than two to occur in the ordered set of cells represented by the first row is a jump in which the factor value of the one cell (not shown) to the left of the J1 cluster boundary is 2.8 times the factor value of the other cell (not shown) to the right of the J1 cluster boundary.

TABLE 3

(Clustering Based Upon Factor Value Jumps Exceeding a Threshold)

| J1  | J2  | J3  | J4   | J5   | J6 | Cut-point |
|-----|-----|-----|------|------|----|-----------|
| 2.8 | 2.9 | 2.1 | 40.5 | 23.3 | 20 | J4        |
| 2.1 | 2.3 | 2.5 | 2.6  | 2.2  |    | J3        |
| 2.6 | 67  | 2.3 | 80   | 2.5  |    | J4        |
| 29  | 3.1 | 11  | 3.4  |      |    | J3        |

The entries in Table 3 illustrate both designation of a cut point based upon the occurrence of the largest jump in factor value by a multiple of two or more and based upon countervailing considerations. Specifically, in the first row, in accordance with the first cut point rule, the cut point is designated to be at J4, the place of the maximum jump. In accordance with the above-described optimization process flow, cells in the ordered set represented by the first row starting from J4 are filtered out. The remaining cells are selected for use in an initial global stage of the mapping process, which emphasizes reducing power dissipation more than meeting timing requirements. The first row of Table 3 is a first example of steps 406 and 412 of FIG. 4.

Table 4 represents a process for selecting cells from a cell library that are to be to an optimizer in accordance with an embodiment of the intention.

TABLE 4

(Process to Select Cells for Delivery to Optimizer)

1. Read all multi-vt libraries.
2. Form k groups of cells where there are k different functionality cells. Denote them as $G_1$ to $G_k$.
3. for each cell $C \in G_{x=1..k}$
   Calculate factor $FC_j$ for $C_{j=1..n}$ from cell slew sensitivity, cell area and cell leakage power (n being the number of cells in $G_x$)
4. Form clusters $CL_y$ (y >= 1) based on all $FC_j$ in $G_x$ where $CL_y$ starts when $FC_z / FC_{z-1} > 2$ for some z where $1 < z <= n$ and $y <= n$
5. Filter cells based on maximum jump criteria and the position of the maximum jump among $CL_y$
6. Pass unfiltered list of cells to optimizer
7. Perform global map with these cells for best leakage.

The second row illustrates operation of a second cut point rule, which seeks to limit the possibility of filtering only a few bad-for-power (low Vt) cells from passage to the optimizer. In the second row, J4 is the maximum jump. However, a countervailing consideration for the second row is that the magnitudes of respective jumps J1, J2, J3 are close to the magnitude of J4. As such, there is likelihood that cells ordered from J3 onwards also are relatively leaky. Since the distribution of magnitude values among J1-J4 is relatively even, and the largest jump J4 is relatively close to the highest order location in the ordering, there is reasonable possibility that there many bad-for-power (i.e., low Vt) cells fall within the clusters from cluster boundaries J1 to J3. For example with cells having jump values that are so close, it is worth evaluating whether there are just a few (e.g. two) cells after jump boundary J4 whereas there may be many more (e.g. ten) cells after jump boundary J3. Given that possibility, filtering out cells after J4 in the ordering, would eliminate just a few (e.g. two) leaky cells, whereas filtering out cells after J3 in the ordering actually would filter out a larger number of additional (e.g. ten) of the more leaky cells. Hence, in accordance with the second cut point rule, J3 is selected as the cut point in order to filter out more of the relatively leaky cells. The second row of Table 3 is a second example of steps 406 and 412 of FIG. 4.

The third row is used to explain the operation of a third cut point rule, which seeks to avoid selection for filtering of too few bad-for-power (i.e., low Vt) cells from passage to the optimizer. In the third row, the cut point is set at J4, the location of the maximum jump in factor value. However, according to the third cut point rule, a countervailing consideration applies if there are too few cells higher in the ordering than the location of the biggest jump (e.g. J4) compared to the total number of cells represented by the ordering. Specifically, the third cut point rule would chose a cut point at a lower (i.e., further to the left) point in the ordering of the cells under certain circumstances. The third row of Table 3 is a third example of steps 406 and 412 of FIG. 4.

More specifically, in one embodiment, the third cut point rule basically determines a threshold bad-for-power cell count. In particular, the bad-for-power cell threshold count is determined terms of a prescribed proportion of the total count of cells in an ordered set of cells. For example, in one embodiment the prescribed proportion is set at 30%. The cut point is selected so that at least 30% of the cells in an ordered set are disposed at higher order locations in the ordering than the location of the cut point. As a result, at least 30% of the cells of the ordering are identified to be filtered out from delivery to the optimizer.

For instance, referring to the third row, assume that there are twenty cells of lower order (i.e., to the left of) than J4 but only five cells of higher order (i.e., to the right of) J4. Thus, in this further example, only 25% of total cells in the set represented by the third row have higher order location than the location of the largest magnitude jump. Since the fraction of cells after J4 (25%) does not reach the prescribed proportion (30%), a lower order (i.e., further to the left) cut-point is selected. So under this third cut-point rule, a cut-point would be selected at a location where at least 30% of the cells have higher order locations.

The fourth row illustrates the operation of a fourth cut point rule, which seeks to ensure that not too many good-for-power (i.e., standard Vt and/or high Vt) cells are filtered out from passage to the optimizer. In the fourth row, the maximum jump occurs at J1. However, according to the fourth rule, a countervailing consideration is that the maximum jump (e.g. J1) should not lie too close to the beginning (i.e., low order end) of the ordering. If J1 was designated to be the cut point, then there would be a significant risk of filtering out standard Vt cells, which are good-for-power. This fourth cut-point rule recognizes that although power is the primary concern during an initial global optimization stage, there also is a desire to meet user specified timing constraints in the global mapping stage itself so as to possibly avoid the need for incremental timing optimizations. In this fourth row example, availability of a few more high Vt or standard Vt cells could make it easier to meet timing requirements during global optimization without being too detrimental to the power optimization effort since the maximum jump is found in such an early cluster itself. Hence, in accordance with a fourth cut point rule, the cut-point is selected at the J3, which is the location of the next largest factor value jump after J1 and which also is not too close to the end of the ordering. The fourth row of Table 3 is a fourth example of steps 406 and 412 of FIG. 4.

In one embodiment, the fourth rule basically determines a threshold good-for-power cell count. More particularly, the good-for-power cell threshold count is determined terms of a prescribed proportion of the total count of cells in an ordered set of cells. For example, in one embodiment the proportion is set at 20%. Under the fourth rule, the cut point is selected so that at least 20% of the cells in an ordered set are disposed at lower order locations in the ordering than the location of the cut point. As a result, at least 20% of the cells of the ordering are identified to not be filtered out from delivery to the optimizer.

Thus, the first cut-point rule avoids substantially all of the leakiest cells, since two clusters follow J4. The second cut-point rule tries to limit the possibility of filtering only a few low Vt cells by filtering out a few more bad-for-power cells. Note that in the second row, only one cluster follows the largest jump, unlike the case for the first row in which two clusters followed the largest jump. The third rule seeks to ensure that not too many relatively bad-for-power cells are passed to the optimizer. The fourth rule attempts to ensure that not too many good-for-power cells are filtered out from passage to the optimizer. Thus, the third and fourth rules are complementary.

Therefore, in accordance with embodiments of the invention, selected library cell characteristics are used to identify a first cluster of cells for use in an initial optimization stage that emphasizes reducing power dissipation and to identify a second cluster of cells to be used in subsequent incremental optimization stage that emphasizes timing consideration. The selected library characteristics are indicative of threshold voltages of transistors represented by cells of the library. Once cells have been appropriately clustered, multiple Vt optimizations based upon these library characteristics advantageously can occur in a single pass.

Figure 5:
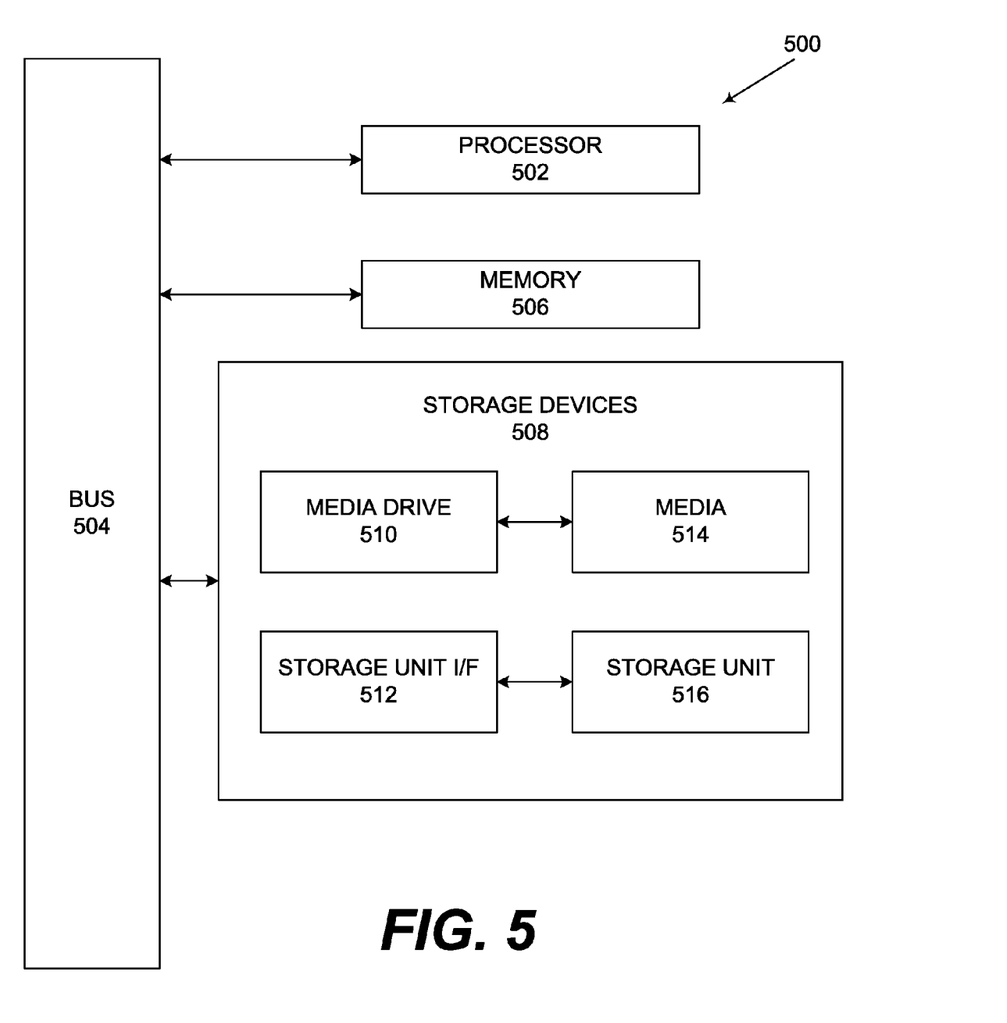
FIG. 5 is an illustrative block level diagram drawing of a computer system that can be programmed to perform processes of embodiments of the invention.

FIG. 5 is an illustrative block diagram level drawing of a computer system that can be programmed to perform processes of embodiments of the invention. Computing system 500 can include one or more processors, such as a processor 502. Processor 502 can be implemented using a general or special purpose processing engine such as, for example, a microprocessor, controller or other control logic. In the example illustrated in FIG. 5, processor 502 is connected to a bus 504 or other communication medium.

Computing system 500 can also include a main memory 506, preferably random access memory (RAM) or other dynamic memory, for storing information and instructions to be executed by processor 502. Main memory 506 also may be used for storing temporary variables or other intermediate information during execution of instructions to be executed by processor 502. Computing system 500 can likewise include a read only memory ("ROM") or other static storage device coupled to bus 504 for storing static information and instructions for processor 502.

The computing system 500 can also include information storage mechanism 508, which can include, for example, a media drive 510 and a removable storage interface 512. The media drive 510 can include a drive or other mechanism to support fixed or removable storage media 514. For example, a hard disk drive, a floppy disk drive, a magnetic tape drive, an optical disk drive, a CD or DVD drive (R or RW), or other removable or fixed media drive. Storage media 514, can include, for example, a hard disk, a floppy disk, magnetic tape, optical disk, a CD or DVD, or other fixed or removable medium that is read by and written to by media drive 510. Information storage mechanism 508 also may include a removable storage unit 516 in communication with interface 512. Examples of such removable storage unit 516 can include a program cartridge and cartridge interface, a removable memory (for example, a flash memory or other removable memory module). As these examples illustrate, the storage media 514 can include a computer useable storage medium having stored therein particular computer software or data.

In this document, the terms "computer program medium" and "computer useable medium" are used to generally refer to media such as, for example, memory 506, storage device 508, a hard disk installed in hard disk drive 510. These and other various forms of computer useable media may be involved in carrying one or more sequences of one or more instructions to processor 502 for execution. Such instructions, generally referred to as "computer program code" (which may be grouped in the form of computer programs or other groupings), when executed, enable the computing system 500 to perform features or functions of the present invention as discussed herein.

It will be understood that the foregoing description and drawings of preferred embodiment in accordance with the present invention are merely illustrative of the principles of this invention. For example, an alternative way to formulate the factor value maybe to have an area exponent in the equation, $$\text{factor} = P\text{cell\_leakage}/(A\text{cell}n \times T\text{cell}) \quad (4)$$

where 'n' is the exponent of Acell and $1 < n < 2$

Therefore, the foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

The invention claimed is:

1. A method to select circuit cells for use in optimization of an integrated circuit design from among a plurality of circuit cells within a circuit cell library, the method comprising:
    obtaining from the circuit cell library a power dissipation value for each cell of the plurality of circuit cells that is indicative of the circuit cell's power dissipation;
    obtaining from the circuit cell library a switching rate value for each cell of the plurality of circuit cells that is indicative of a rate at which the circuit cell's output changes during switching;
    computing a value that is indicative of circuit cell threshold voltage (Vt) for each cell of the plurality of circuit cells, based upon a formulation includes, the power dissipation value obtained for the circuit cell and the switching rate value obtained for the circuit cell;
    ordering, using a computer system, the circuit cells of the plurality of circuit cells based upon the values;
    identifying, using the computer system, a difference between values of circuit cells that are proximate each other within the ordering of the circuit cells that meets a prescribed threshold; and
    designating, using the computer system, a cut point location within the ordering of the cells based upon the identified difference.

2. The method of claim 1 wherein,
    the obtained value for each circuit cell also is indicative of the circuit cell's area.

3. The method of claim 1 wherein,
    each value has a magnitude value; and
    ordering includes ordering the circuit cells based upon magnitudes of their values.

4. The method of claim 1 wherein,
identifying a difference includes identifying differences between values of a pair of adjacent cells within the ordering of the circuit cells that meets the prescribed threshold.

5. The method of claim 1 wherein,
identifying a difference includes identifying a differences between values of a pair of adjacent cells within the ordering of the circuit cells that meets the prescribed threshold; and
designating the cut point location includes designating a cut point location between the pair of adjacent cells.

6. The method of claim 1,
wherein identifying a difference includes,
identifying a first difference between values of first cells that are proximate each other within the ordering of the circuit cells that meets the prescribed threshold; and
identifying a second difference between values of second cells that are proximate each other within the ordering of the circuit cells that meets the prescribed threshold; and
wherein designating a cut point location includes selecting between a cut point location near the first cells and a cut point location near the second cells.

7. The method of claim 1,
wherein identifying a difference includes identifying a difference between values that meets the prescribed threshold for each of multiple pairs of cells that are proximate each other within the ordering; and
wherein designating a cut point location includes selecting a cut point location near a pair of cells for which a difference that meets the prescribed threshold was identified.

8. The method of claim 1 wherein,
obtaining the circuit cell rate of output voltage change includes obtaining the circuit cell slew sensitivity.

9. A method to select circuit cells for use in optimization of an integrated circuit design from among a plurality of circuit cells within a circuit cell library, the method comprising:
obtaining from among the plurality of circuit cells within the circuit cell library the power dissipation value for each cell of the plurality of circuit cells that is indicative of the circuit cell's power dissipation;
obtaining from the circuit cell library a slew sensitivity for each cell of the plurality of circuit cells;
producing a value for each cell of the plurality of circuit cells that is indicative of the cell's threshold voltage based upon a formulation that includes the power dissipation value obtained for the circuit cell and a slew sensitivity value obtained for the cell;
ordering, using a computer system, the circuit cells of the priority based upon the produced values;
identifying, using the computer system, a difference between values of a pair of adjacent cells within the ordering of the circuit cells that meets a prescribed threshold; and
designating, using the computer system, a cut point location between the pair of adjacent circuit cells.

10. The method of claim 9 further including:
obtaining from the circuit cell library an area value for each cell of the plurality of circuit cells;
wherein producing includes producing a value for each cell of the plurality of circuit cells that is indicative of the circuit cell's threshold voltage, based upon a formulation that includes a power dissipation value obtained for the circuit cell and the slew sensitivity value obtained for the circuit cell and the area value obtained for the circuit cell.

11. A method to select circuit cells for use in optimization of an integrated circuit design from among a plurality of circuit cells within a circuit cell library, the method comprising:
obtaining from the circuit cell a power dissipation value for each cell of the plurality of circuit cells that is indicative of the circuit cell's power dissipation;
obtaining from the circuit cell a switching rate value for each cell of the plurality of circuit cells that is indicative of a rate at which the circuit cell's output changes during switching;
computing a value that is indicative of circuit cell threshold voltage (Vt) for each cell of the plurality of circuit cells, based upon a formulation includes, the power dissipation value obtained for the circuit cell and the switching rate value obtained for the circuit cell;
ordering, using a computer system, the circuit cells of the plurality of circuit cells based upon the obtained values;
identifying, using the computer system, a difference in values of circuit cells of a first pair of proximate cells in the ordering that meet a prescribed threshold;
identifying, using the computer system, a difference in values of circuit cells of a second pair of proximate cells in the ordering that meet the prescribed threshold;
providing a cut point location selection rule; and
applying the cut point location selection rule to select a cut point location within the ordering adjacent either the first pair of circuit cells or adjacent the second pair of circuit cells.

12. The method of claim 11 wherein,
the cut point location selection rule selects a cut point location adjacent the pair of circuit cells having an identified difference in value that is larger in magnitude than a magnitude of the difference in value identified for the other pair.

13. The method of claim 11 further including:
applying a cut point location selection rule that seeks to reduce the possibility of selection for filtering only a few bad-for-power cells from passage to an optimizer.

14. The method of claim 11 further including:
applying a cut point location selection rule that seeks to avoid selection for filtering of too few bad-for-power cells from passage to an optimizer.

15. The method of claim 11,
wherein obtaining includes obtaining a value for each cell of the plurality of circuit cells that is indicative of the circuit cell's threshold voltage, based upon at least the circuit cell's power dissipation, the cell's slew sensitivity and the circuit cell's area.

16. The method of claim 11 further including:
applying a cut point location selection rule that seeks to ensure that not too many good-for-power cells are selected to be filtered out from passage to an optimizer.

17. An article of manufacture including a computer readable storage device encoded with computer program code to cause a computer system to perform the method comprising:
obtaining from the circuit cell library a power dissipation value for each cell of the plurality of circuit cells that is indicative of the circuit cell's power dissipation;
obtaining from the circuit cell library a switching rate value for each cell of the plurality of circuit cells that is indicative of a rate at which the circuit cell's output changes during switching;
computing a value that is indicative of circuit cell threshold voltage (Vt) for each cell of the plurality of circuit cells, based upon a formulation includes, the power dissipation value obtained for the circuit cell and the switching rate value obtained for the circuit cell;

ordering, using a computer system, the circuit cells of the plurality of circuit cells based upon the values;

identifying, using the computer system, a difference between values of circuit cells that are proximate each other within the ordering of the circuit cells that meets a prescribed threshold; and designating, using the computer system, a cut point location within the ordering of the cells based upon the identified difference.

18. An article of manufacture including a computer readable storage device encoded with computer program code to cause a computer system to perform the method comprising:

obtaining from the circuit cell a power dissipation value for each cell of the plurality of circuit cells that is indicative of the circuit cell's power dissipation;

obtaining from the circuit cell a switching rate value for each cell of the plurality of circuit cells that is indicative of a rate at which the circuit cell's output changes during switching;

computing a value that is indicative of circuit cell threshold voltage (Vt) for each cell of the plurality of circuit cells, based upon a formulation includes, the power dissipation value obtained for the circuit cell and the switching rate value obtained for the circuit cell;

obtaining from the circuit cell library a slew sensitivity for each cell of the plurality of circuit cells;

producing a value for each cell of the plurality of circuit cells that is indicative of the cell's threshold voltage based upon a formulation that includes, a power dissipation value obtained for the circuit cell and a slew sensitivity value obtained for the cell;

ordering, using a computer system, the circuit cells of the priority based upon the produced values;

identifying, using the computer system, a difference between values of a pair of adjacent cells within the ordering of the circuit cells that meets a prescribed difference; and designating, using the computer system, a cut point location between the pair of adjacent circuit cells.

19. A system comprising a processor, storage medium, and communication bus coupling the processor and the storage medium wherein the storage medium is encoded with computer program code to cause the to perform a method to select circuit cells for use in optimization of an integrated circuit design from among a plurality of circuit cells within a cell library, the method including:

obtaining from the circuit cell a power dissipation value for each cell of the plurality of circuit cells that is indicative of the circuit cell's power dissipation;

obtaining from the circuit cell a switching rate value for each cell of the plurality of circuit cells that is indicative of a rate at which the circuit cell's output changes during switching;

computing a value that is indicative of circuit cell threshold voltage (Vt) for each cell of the plurality of circuit cells, based upon a formulation includes, the power dissipation value obtained for the circuit cell and the switching rate value obtained for the circuit cell;

ordering, using a computer system, the circuit cells of the plurality of circuit cells based upon the obtained values;

identifying, using the computer system, a difference in values of circuit cells of a first pair of proximate cells in the ordering that meet a prescribed threshold;

identifying, using the computer system, a difference in values of circuit cells of a second pair of proximate cells in the ordering that meet a threshold;

providing a cut point location selection rule; and applying the cut point location selection rule to select a cut point location within the ordering adjacent either the first pair of circuit cells or adjacent the second pair of circuit cells.

* * * * *

UNITED STATES PATENT AND TRADEMARK OFFICE
CERTIFICATE OF CORRECTION

PATENT NO. : 7,653,885 B2 Page 1 of 1
APPLICATION NO. : 11/746026
DATED : January 26, 2010
INVENTOR(S) : Sourav Nandy and Qi Wang It is certified that error appears in the above-identified patent and that said Letters Patent is hereby corrected as shown below:

Column 15, line 40, replace "the power" with --a power--
Column 15, line 48, replace "a slew" with --the slew--
Column 15, line 49, replace "the cell" with --the circuit cell--

Signed and Sealed this

Twenty-second Day of June, 2010

David J. Kappos
*Director of the United States Patent and Trademark Office*